Patented Sept. 6, 1949

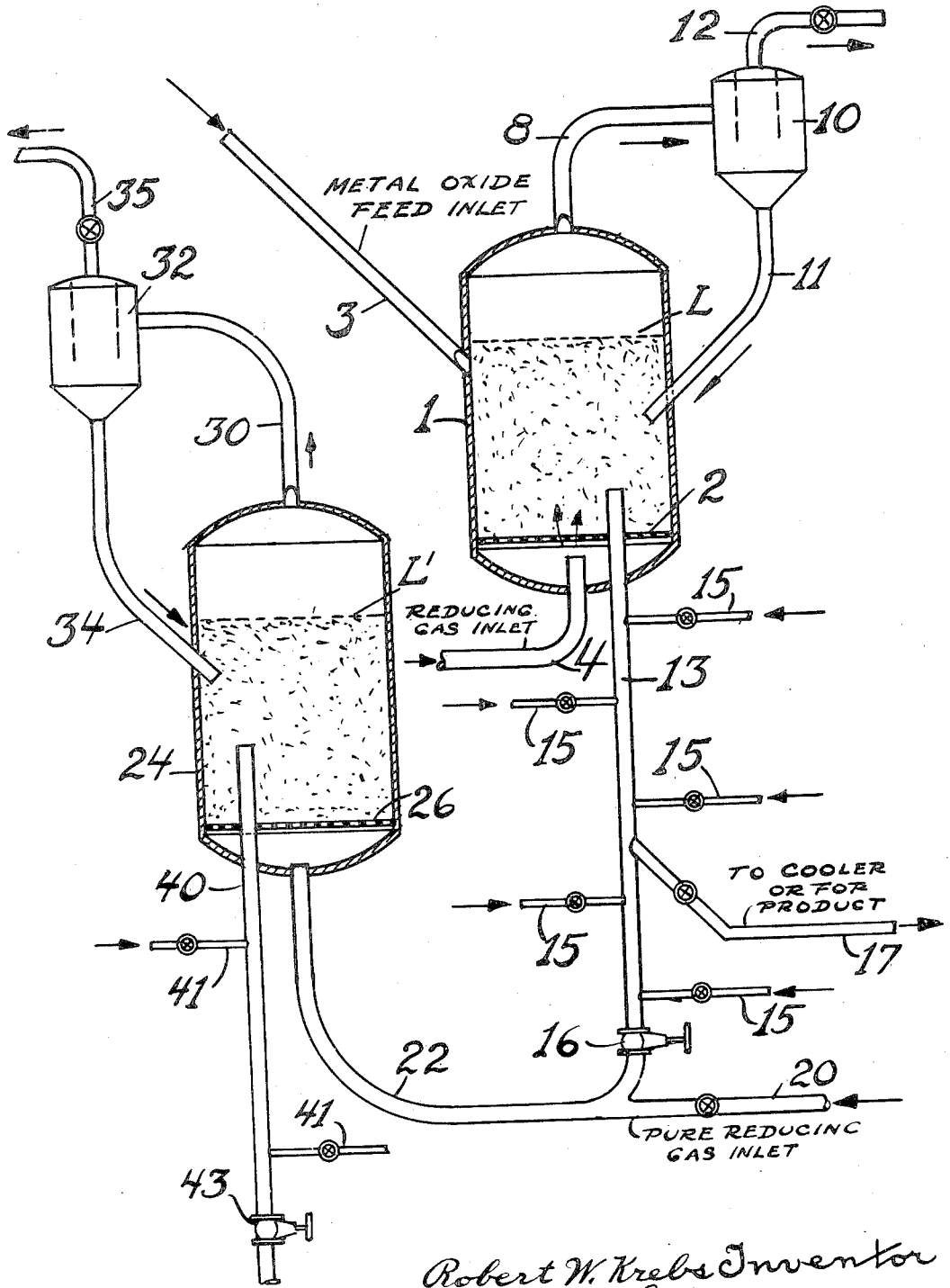

2,481,226

UNITED STATES PATENT OFFICE 2,481,226

TWO-STAGE REDUCTION PROCESS FOR PRODUCING METAL CATALYST

Robert W. Krebs, Baton Rouge, La., assignor to Standard Oil Development Company, a corporation of Delaware Application October 17, 1945, Serial No. 622,930

4 Claims. (Cl. 75—26)

The object of my invention is to reduce metallic oxides, by means of a reducing gas to the corresponding metal in an expeditious and cheaper method than has been previously available.

Heretofore, and prior to my invention hydrogen-containing gas has been used in reducing certain oxides of metals, to the metallic state, e. g. in preparing the metal for use as a catalyst. Thus, for example, cobalt employed in hydrocarbon synthesis, wherein carbon monoxide and hydrogen are caused to interact to effect the synthesis of the said hydrocarbons, is prepared or reduced by hydrogen. In the prior practice the hydrogen was purified to a high degree, particularly with respect to water removal.

I have now found that a considerable saving in the cost of reducing cobalt oxide may be effected by utilizing a two-stage operation; in the first stage of which I use an impure hydrogen gas and in the second stage I use a highly purified gas.

In the accompanying drawing, I have shown an apparatus layout in which a preferred embodiment of my invention may be carried into effect.

That I obtain a highly active form of cobalt is evidenced by the following experimental data:

I treated a material comprising cobalt oxide promoted with thorium oxide and carried on a support for four hours with a hydrogen gas containing merely 0.05 volume per cent $H_2O$ at 700° F. and 1 atmosphere pressure and obtained a cobalt catalyst which I shall designate catalyst A.

Next, I treated a second portion of the same cobalt oxide-containing material for four hours with hydrogen gas containing 2 per cent $H_2O$ at 700° F. and one atmosphere pressure and obtained a catalyst designated as catalyst B.

Thereafter, I treated another portion of the same material with hydrogen gas containing 2 volume per cent water for 3½ hours at 700° F. and under one atmosphere pressure and then for ½ hour under the same conditions of temperature and pressure, but using a hydrogen gas containing 0.05 volume per cent water, which treatment resulted in the formation of a cobalt catalyst which I shall designate catalyst C.

In order to show the effect of the water vapor content of the hydrogen on the catalytic activity of the reduced cobalt, I tested the three catalysts described above for the synthesis of hydrocarbons by subjecting them to a flow of gas containing 2 parts of hydrogen and one part of carbon monoxide at a rate of 100 volumes of gas per hour per volume of catalyst at 390° F. and atmospheric pressure. The following tabulation shows the conditions used for the reduction of the three catalytic materials and the yields of liquid hydrocarbons which I obtained from them under the aforementioned test conditions:

| Catalyst | A | B | C |
|---|---|---|---|
| Reduction Conditions: | | | |
| Hours with $H_2$ at 2% $H_2O$ | 0 | 4 | 3½ |
| Hours with $H_2$ at 0.05% $H_2O$ | 4 | 0 | ½ |
| Temperature, °F | 700 | 700 | 700 |
| Space Velocity, v./v./hr | 5,000 | 5,000 | 5,000 |
| Yield of Liquid Hydrocarbons: | | | |
| cc./m³ $H_2$+CO, maximum | 144 | 136 | 148 |
| cc./m³ $H_2$+CO, average | 136 | 118 | 137 |

The effect of water content of the gas as a poison in the reduction reaction is shown by the yield of liquid hydrocarbons obtained when these catalysts were used for hydrocarbon synthesis at a standardized set of conditions, namely 390° F. and 100 v./v./hr. with a synthesis gas composed of two parts hydrogen and one part CO.

The foregoing results show that during merely 30 minutes of a four-hour treatment, it was necessary to employ a very pure hydrogen to obtain the same activity in a reduced cobalt catalyst from the same unreduced material. Hence, a considerable saving in the purification of the hydrogen was effected.

My process of reducing reducible metallic oxides may be effected in any convenient apparatus, such as an ordinary shell-type reactor provided with suitable conduit means for introducing and withdrawing gas and heating means to maintain the proper temperature.

However, in the event that the unreduced catalyst is in powder form or even in lump or granule form up to a size of say, 2 to 4 mesh, I may employ a hindered settler reactor and effect the reduction of the metal oxide while the same is in "fluidized" form. Toward this end, therefore, I may provide a reactor 1 into which I continuously feed a metal oxide either in powder form or in granular form, and meanwhile I discharge a reducing gas through line 4 into the reactor. The gas which may be hydrogen, and which has not been treated for water vapor removal passes upwardly through a screen or grid 2 into the mass of catalyst and the linear velocity of the gas is controlled between 0.2 to 10 ft./sec. (depending upon the average size of the catalyst and the operating pressure), so as to form a dense, turbulent ebullient suspension of solid in gas—the condition or state I previously referred to as "fluidized." Since the reaction of reduction may be exothermic, heat will be released, but by withdrawing a portion of the mass of solids from reactor 1, I may cool the same and return it to the reactor (in means not shown). Very accurate and uniform temperatures may easily be maintained in the reactor due to the turbulence of the solids therein.

The reduced or partially reduced oxide is withdrawn through bottom drawoff pipe 13 carrying gas leads or taps 15 through which I introduce a slow current of gas to increase the fluidity of the downflowing solid and/or to prevent bridging, plugging, etc., in the said pipe. Further, to control the rate of flow in pipe 13, I provide a valve 16. The solid discharges into a line carrying a highly purified and dried gas such as pure hydrogen in line 20 and forms a suspension therein which is conveyed to a second reactor 24. In this latter reactor, the same gas velocity is maintained as in 1, and, therefore, a second fluidized mass of catalyst in a reducing gas is formed. The product is withdrawn through pipe 40 carrying gas taps 41 and flow control valve 42.

In both reactors 1 and 24, the residence time is fixed at the desired value. I prefer to use a longer residence time in reactor 1 (say 2 to 5 hours) than in reactor 24 (say ½ to 3 hours) in order to minimize the use of the purified hydrogen. The residence time is controlled by the valves in the drawoff lines. It will be noted that in the drawing there are reference characters L and L¹. These refer to the upper level of the dense portion of the suspensions in the respective reactors. Above these levels the concentration of solid in gas decreases sharply. Thus, where a 200-mesh powder (average size) is in suspension, the same may weight in the case of a supported cobalt catalyst 26 lbs./cu. ft., the gas exiting from the top of the reactors may contain only enough dust to weight 0.003 lbs./cu. ft.

The gas in reactor 1 exits through line 8 and passes through a dust collector 10 (or several of them) to remove entrained powder, which is returned to the reactor via line 11, while the gas is rejected through line 12. In the same manner, the gas exits from reactor 24 via line 30, passes through dust collector or collectors 32 wherein powder is separated and returned to the reactor through line 34, while the gas is rejected from the system through line 35 or is used for further reduction in the first stage reactor 1. By the latter arrangement, the fresh reducing gas containing a minimal amount of impurities is used to finish the reduction in the second stage in reactor 24 and the gas discarded from this stage is used as make-up gas for the initial reduction of the charge in reactor 1.

In certain cases, a single reactor only need be employed in which case line 17 becomes a line for the recovery of the final product. In this modification of my invention, only reactor 1 would be employed and, of course, the operation would be a batch operation wherein the oxide, in the form of a stationary bed, in the reactor is treated for, say, 3½ hours with impure hydrogen and then treated in the same reactor for ½ hour with purified hydrogen, whereupon at the end of the ½ hour period the treatment with hydrogen is discontinued, the catalyst is withdrawn from the reactor 1 and fresh charge placed therein.

It is also possible to use super-atmospheric pressure in my reactors, if that is necessary or desirable since the reactor may be conveniently sealed against atmospheric leakage by manipulation of the valves shown or others required. Temperatures of from 500–1000° F. may be employed, with temperatures of the order of around 700° F. being preferred.

While I have devoted much attention to the matter of cobalt oxide reduction, I intend to disclose that my improvements extend to means for reducing other metal oxides, such oxides including FeO, $Fe_2O_3$, the oxides of nickel, manganese, chromium, etc.—in brief, any oxide reducible by hydrogen and/or other reducing gas.

To the skilled engineer experienced in the field of metal oxide or ore reduction, many modifications of my invention not expressly mentioned herein, but falling within the spirit of my invention, will readily occur. Thus, the proper temperatures, pressures, and other operating conditions for some specific application of the invention to reduction projects will be known to the skilled technician or made by means of a few simple experiments. Also instead of using merely two reactors as shown in the drawing, I may employ three or more reducing reactors although I prefer the embodiment shown.

What I claim is:

1. The method of reducing a heavy metal oxide of the class consisting of iron oxide and cobalt oxide at elevated temperatures and under at least atmospheric pressure to form a catalyst material, which comprises forming the catalyst material in powdered form into a fluidized mass in a first reduction zone and treating it therein with an impure hydrogen gas containing water vapor, supplying the said gas to the reducing zone at a lower point thereof and causing it to flow upwardly in the said reducing zone at a low superficial velocity, so as to form the said fluidized mass having an upper dense phase level, permitting the said metal oxide material to remain resident in the reaction zone for a period of time sufficient to effect a major portion of the reduction, effecting separation of the main bulk of the catalyst material in the upper portion of said reducing zone by delayed settling, withdrawing the gaseous products of the reduction, substantially freed of solids, from an upper portion of said reduction zone, withdrawing from a lower point of said fluidized mass, through an aerated column, the at least partly reduced heavy metal oxide and causing it to flow into a second reduction zone, forming the partially reduced metal oxide into a second fluidized mass in said second reduction zone, causing substantially anhydrous hydrogen to be discharged into a lower portion of said second reduction zone and causing the said hydrogen to flow upwardly in said second reduction zone at a superficial velocity so as to form said fluidized mass having an upper dense phase level, permitting the catalyst material to remain in the said second reduction zone for a sufficient period of time substantially to complete the reduction, effecting separation of the main bulk of the catalyst material in the upper portion of said reducing zone by delayed settling, withdrawing vapors from said second zone substantially freed of solids, and recovering from said second reduction zone, substantially completely reduced catalyst material.

2. The method set forth in claim 1 in which the temperature in both zones is of the order of about 700° F.

3. The method set forth in claim 1 in which the metal oxide undergoing reduction in the said zones is cobalt oxide.

4. The method of reducing cobalt oxide to a state in which it possesses a high degree of activity when employed in a hydrocarbon synthesis reaction involving the reduction of carbon monoxide by hydrogen, which comprises subjecting the cobalt oxide to the influence of an impure hydrogen-containing gas carrying a substantial quantity of water at a temperature in the range of from about 500° F. to 1000° F. while under a pressure of at least normal atmospheric, permitting the cobalt oxide to remain in contact with the said hydrogen-containing gas under the conditions of temperature and pressure stated, until a preponderance thereof is converted to the metallic state and thereafter flowing a substantially anhydrous hydrogen-containing gas into contact with the partially reduced cobalt oxide under the conditions of temperature and pressure stated until the cobalt is substantially completely reduced.

ROBERT W. KREBS.

REFERENCES CITED

The following references are of record in the file of this patent:

UNITED STATES PATENTS

| Number | Name | Date |
| --- | --- | --- |
| 1,984,380 | Odell | Dec. 18, 1934 |
| 2,120,958 | Coons | June 14, 1938 |
| 2,142,694 | Maier | Jan. 3, 1939 |
| 2,274,639 | Scheuermann et al. | Mar. 3, 1942 |
| 2,399,984 | Caldwell | May 7, 1946 |